No. 637,426. Patented Nov. 21, 1899.
B. F. SPARR.
NUT LOCK.
(Application filed Oct. 21, 1898.)
(No Model.)

WITNESSES.
A. Knight Croad.
Albert I. George.

INVENTOR.
Benjamin Franklyn Sparr.
per. Robert T. Phillips.
Attorney.

United States Patent Office.

BENJAMIN FRANKLYN SPARR, OF LONDON, ENGLAND, ASSIGNOR TO MARY SPARR, OF NEW YORK, N. Y.

NUT-LOCK.

SPECIFICATION forming part of Letters Patent No. 637,426, dated November 21, 1899.

Application filed October 21, 1898. Serial No. 694,244. (No model.)

*To all whom it may concern:*

Be it known that I, BENJAMIN FRANKLYN SPARR, a citizen of the United States of America, residing at 19 Brixton road, Brixton, London, in the county of Surrey, England, have invented a new and Improved Method of and Device for Locking Nuts on Bolts, of which the following is a full and complete specification.

This invention relates to an improved means or method of and device for locking nuts on their bolts, and thus preventing them from working loose owing to vibration or other causes, and is particularly applicable for use in connection with the nuts and bolts used with fish-plates for rail-joints.

The invention comprises, broadly, a means for filling or partially filling one or more of the threads of the bolt-screw which is or are nearest the outer face of the nut by means of a suitably-shaped piece of wire or metal adapted to be anchored or fixed to an adjacent bolt or the like.

Figure 1:
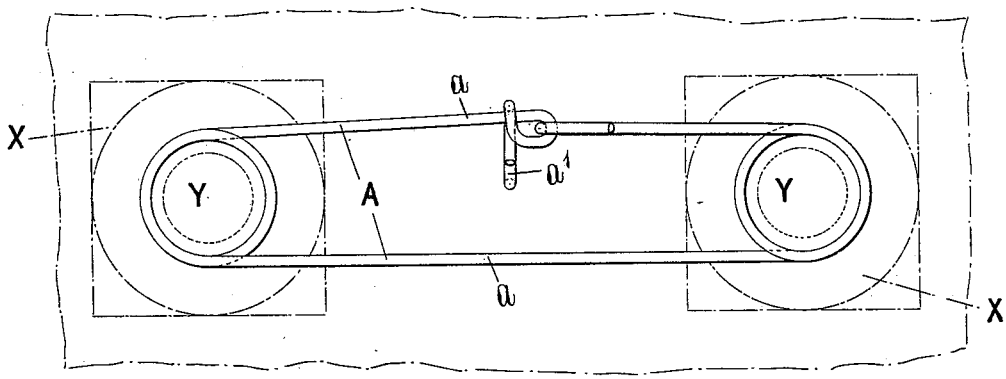
Figure 2:
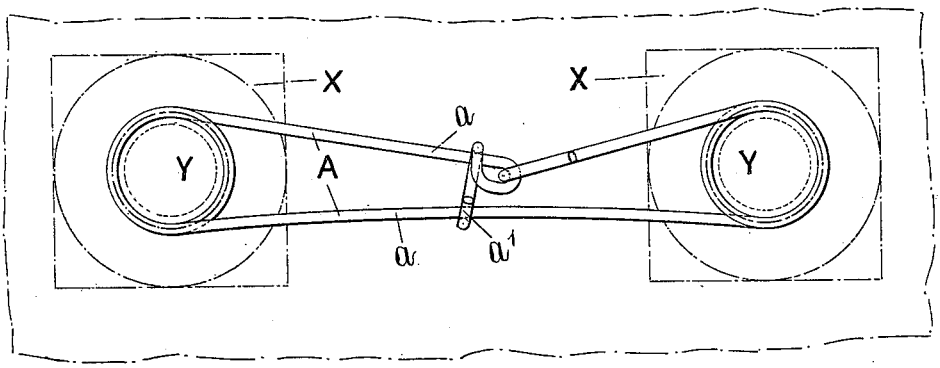
Figure 3:
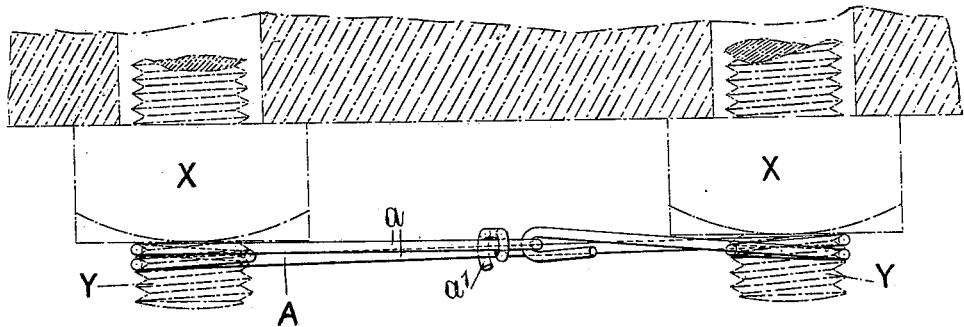

In the accompanying drawings, which illustrate a method of carrying my invention into practice, Figures 1 and 2 are views in front elevation of my nut-locking device applied to two bolts in an open and locked position, respectively; and Fig. 3 is a view in plan thereof.

Throughout the views similar parts are marked with like letters of reference.

In carrying my invention into practical effect, whereby the nuts on two adjacent bolts are securely locked, I proceed as follows: After the nuts X have been screwed home a loop or link A, formed from sheet metal or wire and with or without one or more complete coils or convolutions on its ends of such a size or length as to just pass over the threaded ends of the bolts Y, is slipped on close up to the faces of the nuts X. The center or middle portions $a\ a$ of the loop or link A lying between the two bolts are then either drawn together or forced apart by any suitable form of tool, so as to put a tension or strain on the loop or link A, causing the ends thereof which encircle the bolts Y, and which are so shaped or are of such a cross-section as to be capable of freely entering and engaging the grooves or screw-threads of the said bolts, to engage wholly or partially with one or more of the grooves or threads thereon, and so prevent any possibility of the nuts X shaking loose or even being turned. I prefer to keep the link or loop A under this strain or tension by forming the link or loop A from a length of wire in such a way as to allow of one or both the ends thereof being used as a clip $a'$ to retain the loop or link in its strained or tensioned position.

What I claim, and desire to secure by Letters Patent, is—

A device for locking nuts on bolts consisting of a length of wire bent into a link or loop in such a manner that each of its ends or bends forms one or more complete coils or convolutions of such a diameter and distance apart as to just pass over the threaded ends of two adjacent bolts and to engage with or partially fill the threads thereof nearest the outer faces of the nuts when the coils are contracted or reduced by tensioning or drawing together the middle portion of the link or loop, such tension being maintained by so placing and bending the free ends of the wire forming the link or loop that one end engages a bend near the end of the other end which in turn engages the opposite side of the main link or loop at or near its center, as set forth.

BENJAMIN FRANKLYN SPARR.

Witnesses:
 WILLIAM H. JAMES,
 ALFRED K. CROAD.